(12) United States Patent
Berteussen et al.

(10) Patent No.: US 9,250,344 B2
(45) Date of Patent: Feb. 2, 2016

(54) METHOD TO ACQUIRE SEISMIC DATA IN SHALLOW SEA WATER ENVIRONMENT

(75) Inventors: Karl-Andreas Berteussen, Abu Dhabi (AE); Yuefeng Sun, College Station, TX (US)

(73) Assignee: The Petroleum Institute, Abu Dhabi (AE)

( * ) Notice: Subject to any disclaimer, the term of this patent is extended or adjusted under 35 U.S.C. 154(b) by 650 days.

(21) Appl. No.: 13/271,249

(22) Filed: Oct. 12, 2011

(65) Prior Publication Data

US 2012/0092957 A1   Apr. 19, 2012

Related U.S. Application Data

(60) Provisional application No. 61/392,532, filed on Oct. 13, 2010.

(51) Int. Cl.
*G01V 1/38* (2006.01)
*G01V 1/28* (2006.01)

(52) U.S. Cl.
CPC .............. *G01V 1/3808* (2013.01); *G01V 1/286* (2013.01); *G01V 1/3852* (2013.01); *G01V 2210/1427* (2013.01); *G01V 2210/60* (2013.01)

(58) Field of Classification Search
USPC .................................. 367/38, 73, 75; 702/14
See application file for complete search history.

(56) References Cited

U.S. PATENT DOCUMENTS 5,206,837 A * 4/1993 Beasley et al. ................ 367/38
6,026,057 A * 2/2000 Byun et al. .................... 367/52

(Continued)

OTHER PUBLICATIONS

Caldwell et al., "Shear Waves Shine Brightly", Oil Field Review, Spring 1999, pp. 1-15.*

(Continued)

*Primary Examiner* — Ian J Lobo
(74) *Attorney, Agent, or Firm* — Fitch, Even, Tabin & Flannery LLP (57) ABSTRACT

The various embodiments herein provide a method to acquire seismic data to estimate reservoir characteristics in a shallow sea water environment. According to an embodiment herein, a method comprises acquiring four component ocean bottom cable (4C OBC) seismic data using a hydrophone and a three component geophone by varying a time delay between the shots and spacing between the shots. A full acoustic modeling process and an elastic modeling process are applied to the acquire 4C OBC seismic data to acquire a pressure data and an inline geophone data to estimate a horizontal component data and a reflected shear wave data. The estimated horizontal component data are NMO corrected and stacked by varying sampling intervals to remove noise component in the acquired seismic data. A shear wave energy data is estimated from the acquired pressure data to estimate shear wave properties of a sea bed and a subsurface carbonate reservoir.

11 Claims, 7 Drawing Sheets

(56) References Cited

U.S. PATENT DOCUMENTS

| | | | |
|---|---|---|---|
| 6,205,403 B1* | 3/2001 | Gaiser et al. | 702/14 |
| 6,798,714 B1* | 9/2004 | Trickett | 367/52 |
| 8,477,561 B2* | 7/2013 | Singh et al. | 367/20 |
| 2003/0055569 A1* | 3/2003 | Shatilo et al. | 702/17 |
| 2003/0117893 A1* | 6/2003 | Bary | 367/16 |
| 2004/0008578 A1* | 1/2004 | Leaney | 367/15 |
| 2007/0140056 A1* | 6/2007 | Gratacos | 367/38 |
| 2008/0071709 A1* | 3/2008 | Strack | 706/20 |
| 2012/0026830 A1* | 2/2012 | Wang et al. | 367/24 |

OTHER PUBLICATIONS

Kristiansen et al., "Using Multicomponent Seismic Data to better Understand Reservoir Characteristics", 5th Conference and Exposition on Petroleum Geophysics, Hyderabad-2004 India, India pp. 628-636.*

Sun et al, "4C Seismic Data ANalysis for Reservoir Monitoring in Shallow-water ENvironment", SPE-117872-MS, Abu Dhabi International Petroleum Exhibition and Conference, Nov. 3-6, 2008, Abu Dhabi, UAE.*

* cited by examiner (Prior Art)

FIG. 1

(Prior Art)

FIG. 2

(Prior Art)

METHOD TO ACQUIRE SEISMIC DATA IN SHALLOW SEA WATER ENVIRONMENT

CROSS-REFERENCE TO RELATED APPLICATION

This application claims the benefit of U.S. provisional patent application Ser. No. 61/392,532, filed Oct. 13, which is incorporated herein by reference in their entireties.

BACKGROUND

1. Technical Field

The embodiments herein generally relates to a method of processing seismic data and particularly to a method of processing multi-component marine seismic data. The embodiments herein more particularly relates to a method of processing multi-component marine seismic data in order to estimate the shear wave properties of the seabed and the subsurface carbonate reservoirs.

2. Description of the Related Art

Figure 1:
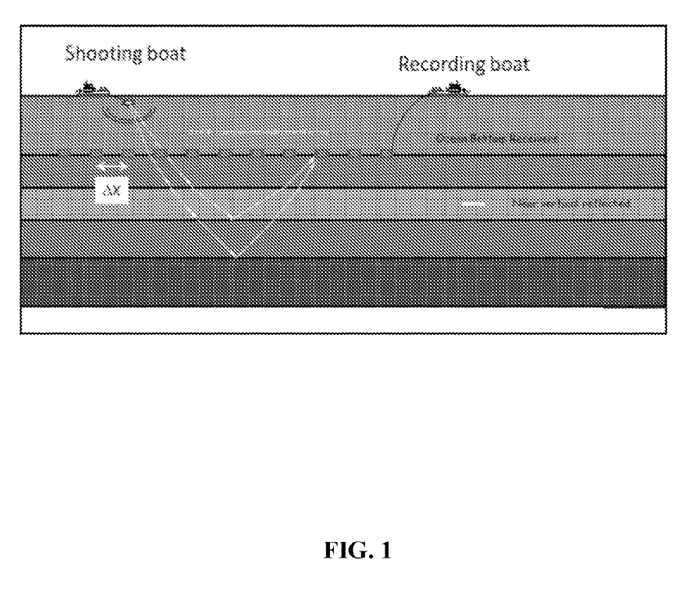
FIG. 1 illustrates a schematic diagram of a system for acquiring a Seismic data using a source in the water and receivers on the sea-bottom, according to a prior art.

Seismic acquisition using a source in the water and receivers on the sea-bottom is now a standard industry operation. The normal operation is to use a seismic source in the water towed behind a boat (as shown in FIG. 1). This source will generate pressure waves (P-waves) in the water. There is then a set of recording instruments on the sea-bottom. They usually are assembled in a long cable, but single instruments (nodes) might also be used. Typically each instrument will have a 3-component geophone and a hydrophone (therefore called 4-component) or only a vertical geophone and a hydrophone (therefore called 2-component). The 3-component geophone will measure the particle movement of the sea-bottom along 3-orthogonal axis while the hydrophone will measure the pressure variation in the water at the sea-bottom. As mentioned, sometimes only a vertical component and a hydrophone are used. For the problem discussed herein, both 2- and 4-component systems are relevant.

In the existing techniques, the particle movement and the pressure variations caused by the seismic source will be recorded each time a shot is fired. The data is processed using standard, but technically advanced methods. From this a geological model of the underground is made. The most used wave-mode is the wave that has travelled as a P-wave (pressure wave) all the way from the source to a reflector where it is reflected upward and finally registered on the receivers (as shown in FIG. 1).

When deciding on the geometry of the recording system one of the most important parameters is the distance between the recording instruments ($\Delta x$, as shown in FIG. 1). The theory for this is well known. The so called Nyquist theorem states that 2 measurements are needed per wavelength. If one has wavelength in the data that are shorter than 2 times the measurement interval one will not just get bad data, one will get so called aliasing effects which in the end give positively wrong data.

Thus, if a desired shortest apparent wavelength to be measured is $\lambda$, then the distance between the instruments ($\Delta x$) must be less than or equal to $\lambda/2$. During a mapping of the underground we want to see the details that are as small as possible. This implies that we want to preserve the wavelengths as short as possible. An apparent wavelength ($\lambda a$) and frequency (f) are connected by the following formulae, $$\lambda a = Va/f, \text{ where } Va \text{ is the apparent velocity.}$$

For the waves typically used for structural imaging (the P-waves) we require that Va might be very large, say of the order of 4000 msec for a frequency of 80 Hz. Thus one have that $\lambda a$ is 50 meter and an acceptable sampling interval ($\Delta x$) is 4000/(2*80)=25 m, which is the typical distance used in today's technology.

Figure 2:
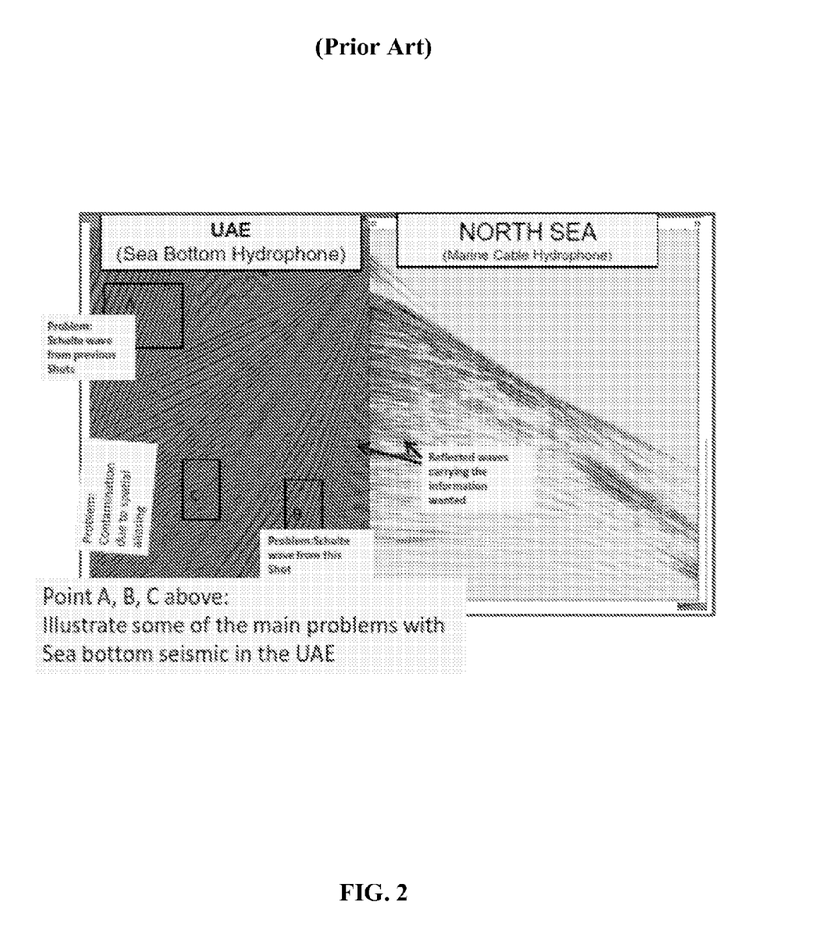
FIG. 2 illustrates a recording data gathered from the North Sea (right side) and the Arabian Gulf (left side), according to a prior art.

FIG. 2 illustrates a recording gathered from the North Sea (right side) and the Arabian Gulf (left side). This is the data recorded after one shot have been fired in a series of 4 shots. The wave-modes which are interested, such as the so called reflected P-waves are also indicated. These are clearly seen on the North Sea, while they are difficult to see on the Arabian Gulf data as shown in FIG. 2. This is because they are masked by a number of other waves such as Scholte waves which we cannot use for structural imaging. These Scholte waves are horizontal travelling waves trapped in the shallow upper layers because of the strong geological boundaries in the upper part of the subsurface strata. In order to remove the problematic waves properly in the subsequent processing we need to measure them correctly.

Figure 3:
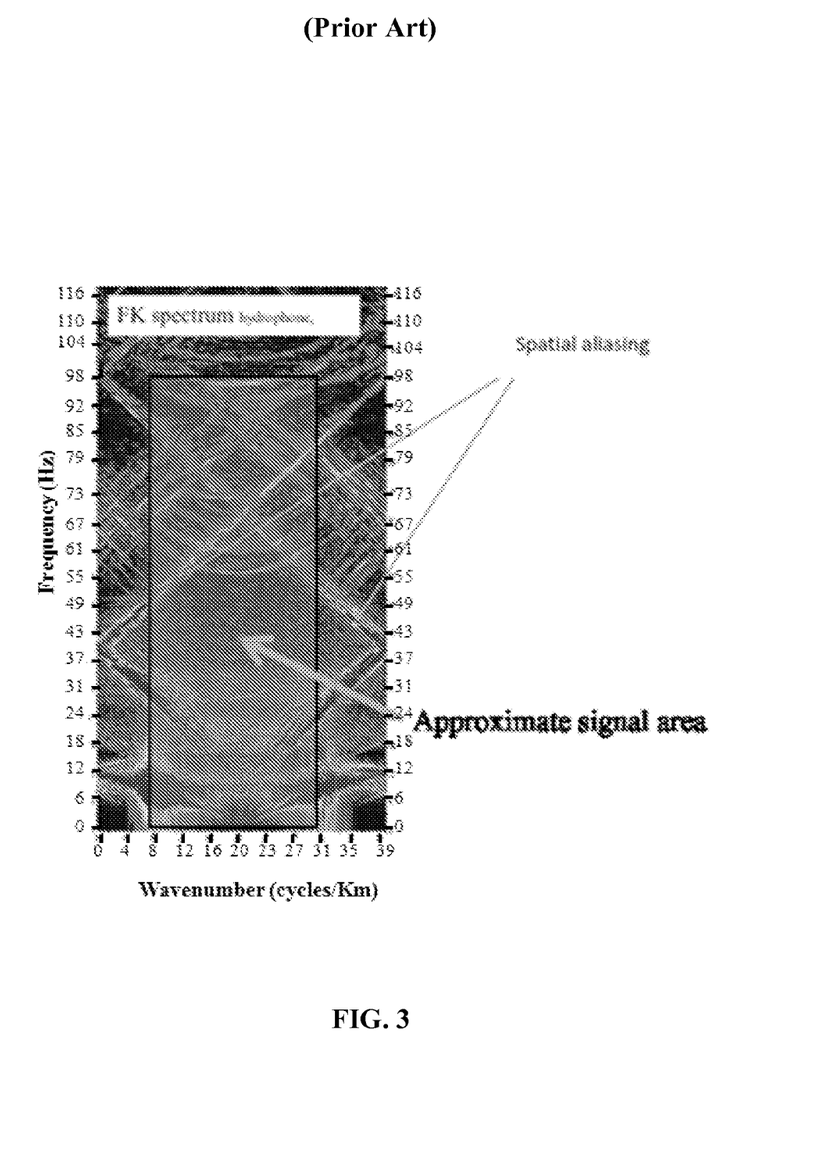
FIG. 3 illustrates a called frequency-wave-number spectra for a typical data gathered in the Arabian Gulf according to a prior art.

One of the existing technologies uses the sampling interval (distance between recording stations) typically of 25 meter. FIG. 3 illustrates a so called frequency-wave-number spectra for a typical data gathered in the Arabian Gulf on which a sampling interval is done. As expected, we get very strong aliasing effects in the data, which again will result in serious problems when trying to image the structures below.

Therefore, there is a need for a method of processing a multi-component marine seismic data in shallow water environment. There is also a need to define which upper frequency we want and also once the upper frequency is decided there is a need for a system with sampling interval that respects the Scholte waves and similar ground roll type waves. Further there is a need to measure these disturbing waves properly. Still there is a need to develop a system with a desired sampling interval to measure the disturbing waves properly.

The abovementioned shortcomings, disadvantages and problems are addressed herein and which will be understood by reading and studying the following specification.

OBJECTS OF THE EMBODIMENTS

The primary object of the embodiments herein is to provide a method for processing multi-component marine seismic data in order to estimate the shear wave properties of the seabed and the subsurface carbonate reservoirs.

Another object of the embodiments herein is to provide a method to understand and interpret the 4C OBC data.

Yet another object of the embodiments herein is to provide a velocity dispersion diagrams for the waves for geological models typical to those in the upper part of the strata in the Arabian Gulf.

Yet another object of the embodiments herein is to provide a method to remove scholte waves and similar ground roll waves to generate better image of the underground.

These and other objects and advantages of the embodiments herein will become readily apparent from the following detailed description taken in conjunction with the accompanying drawings.

SUMMARY

The various embodiments herein provide a method to acquire seismic data to estimate reservoir characteristics in a shallow sea water environment. According to an embodiment herein, a method to acquire seismic data to estimate reservoir characteristics in a shallow sea water environment comprises acquiring four component ocean bottom cable (4C OBC) seismic data using a hydrophone and a three component geophone by varying a time delay between a plurality of shots and spacing between shots. A full acoustic modelling process and an elastic modelling process are applied to acquire 4C OBC seismic data to process the acquired 4C OBC seismic data to acquire a pressure data and an inline geophone data. A horizontal component data and a reflected shear wave data are estimated from the acquired 4C OBC seismic data. NMO-correction process is performed on the estimated horizontal component data. The estimated horizontal component data are stacked by varying sampling intervals to remove noise component in acquired seismic data. A shear wave energy data is estimated from the acquired pressure data to estimate shear wave properties of a sea bed and a subsurface carbonate reservoir.

According to one embodiment herein, the 4C OBC seismic data is acquired using a numeric full wave form elastic model.

According to one embodiment herein, the method further comprises building earth models including 1000 layers by using density, compression and shear wave logs acquired near 2D 4C OBC seismic limes.

According to one embodiment herein, the full acoustic modelling is applied using a hydrophone source and wherein the hydrophone source is a band filtering wavelet with a frequency of 5-90 hertz.

According to one embodiment herein, the full acoustic modelling is applied by setting a shear wave velocity to zero for all layers to perform 2D and 3D full waveform finite-difference modelling (FDM) to acquire both a pressure data and an inline geophone data.

According to one embodiment herein, the elastic modelling is applied by using a 2D finite-difference grid with a size of 2.5 m×2.5 m and a temporal sampling interval of 0.25 ms to avoid spatial aliasing and to ensure numerical stability.

According to one embodiment herein, the elastic modelling is applied based on the density, compression and shear wave logs to verify and separate a shear wave energy included in a 4C OBC seismic data.

According to one embodiment herein, the shear wave energy is acquired based on a difference between a pressure data acquired by using an acoustic modelling and a pressure data acquired by using an elastic modelling.

According to one embodiment herein, the inline horizontal component is acquired by marking a reservoir top level and a reservoir bottom level based on acquired S-wave velocity log data, and by creating a stack based on a RMS velocity derived from the S-wave velocity log and by assuming an instrument distance of 2.5 meter and a maximum off set of 0.5 km.

According to one embodiment herein, a time delay between the pluralities of shots fired in a shallow water environment is more than a time delay between the pluralities of shots fired in a deep-water environment.

According to one embodiment herein, spacing between the pluralities of shots fired in a shallow water environment is more than spacing between the pluralities of shots fired in a deep-water environment.

According to one embodiment herein, the method further comprises applying multiple attenuation algorithms to reduce a noise due to Sholte waves in a present shot and a noise due to Sholte waves in a previous shot.

According to one embodiment herein, the 4C OBC seismic data is processed using a forward elastic modelling to use PS-S reflections to estimate shear wave properties of a sea bed and a subsurface carbonate reservoir.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a method to acquire seismic data to estimate reservoir characteristics in a shallow sea water environment. According to an embodiment herein, a method to acquire seismic data to estimate reservoir characteristics in a shallow sea water environment comprises acquiring four component ocean bottom cable (4C OBC) seismic data using a hydrophone and a three component geophone by varying a time delay between a plurality of shots and spacing between shots. A full acoustic modelling process and an elastic modelling process are applied to acquire 4C OBC seismic data to process the acquired 4C OBC seismic data to acquire a pressure data and an inline geophone data. A horizontal component data and a reflected shear wave data are estimated from the acquired 4C OBC seismic data. NMO-correction process is performed on the estimated horizontal component data. The estimated horizontal component data are stacked by varying sampling intervals to remove noise component in acquired seismic data. A shear wave energy data is estimated from the acquired pressure data to estimate shear wave properties of a sea bed and a subsurface carbonate reservoir.

According to one embodiment herein, the 4C OBC seismic data is acquired using a numeric full wave form elastic model.

According to one embodiment herein, the method further comprises building earth models including 1000 layers by using density, compression and shear wave logs acquired near 2D 4C OBC seismic limes.

According to one embodiment herein, the full acoustic modelling is applied using a hydrophone source and wherein the hydrophone source is a band filtering wavelet with a frequency of 5-90 hertz.

According to one embodiment herein, the full acoustic modelling is applied by setting a shear wave velocity to zero for all layers to perform 2D and 3D full waveform finite-difference modelling (FDM) to acquire both a pressure data and an inline geophone data.

According to one embodiment herein, the elastic modelling is applied by using a 2D finite-difference grid with a size of 2.5 m×2.5 m and a temporal sampling interval of 0.25 ms to avoid spatial aliasing and to ensure numerical stability.

According to one embodiment herein, the elastic modelling is applied based on the density, compression and shear wave logs to verify and separate a shear wave energy included in a 4C OBC seismic data.

According to one embodiment herein, the shear wave energy is acquired based on a difference between a pressure data acquired by using an acoustic modelling and a pressure data acquired by using an elastic modelling.

According to one embodiment herein, the inline horizontal component is acquired by marking a reservoir top level and a reservoir bottom level based on acquired S-wave velocity log data, and by creating a stack based on a RMS velocity derived from the S-wave velocity log and by assuming an instrument distance of 2.5 meter and a maximum off set of 0.5 km.

According to one embodiment herein, a time delay between the pluralities of shots fired in a shallow water environment is more than a time delay between the pluralities of shots fired in a deep-water environment.

According to one embodiment herein, spacing between the pluralities of shots fired in a shallow water environment is more than spacing between the pluralities of shots fired in a deep-water environment.

According to one embodiment herein, the method further comprises applying multiple attenuation algorithms to reduce a noise due to sholte waves in a present shot and a noise due to sholte waves in a previous shot.

According to one embodiment herein, the 4C OBC seismic data is processed using a forward elastic modelling to use PS-S reflections to estimate a shear wave properties of a sea bed and a subsurface carbonate reservoir.

Figure 4A:
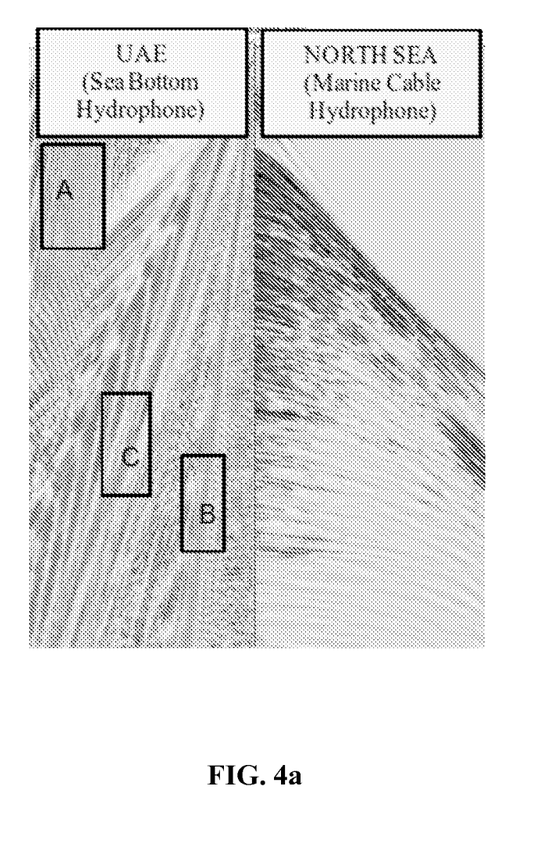
FIG. 4a illustrates a 2D 4C OBC data recording gathered from a North Sea and an Arabian Gulf, with a method to acquire seismic data according to one embodiment herein.

FIG. 4a illustrates a 2D 4C OBC data recording gathered from a North Sea and an Arabian Gulf, according to one embodiment herein. A 2D 4C OBC data recording is gathered from the Arabian Gulf where the water depth is about 10 m and a bottom with P-wave velocity varying from 3 to 4.8 km/s. The maximum offset of the field data is 10 km. The receiver interval is 25 m and the recording length is 6 seconds. FIG. 4a shows a part of a typical shot gather from the Arabian Gulf together with a typical streamer gather from the North Sea. Comparing these shot gathers, one observes some striking differences in the seismic data quality collected in these two regions. The Arabic Gulf data have three main noise elements not seen on the North Sea data. These are noise from previous shots (box A in FIG. 4a) and noise from the present shots (boxes B and C in FIG. 4a respectively).

A full acoustic and elastic modeling is performed and then results are compared with observed 4-component (4C) seismic data. It is found that although the data is very complicated the simulations to a large extent predict the observations. In the forward FDM elastic modeling we use a 2D finite difference grid size of 2.5 m×2.5 m and a temporal sampling interval of 0.25 ms to avoid spatial aliasing and ensure numerical stability.

Figure 4B:
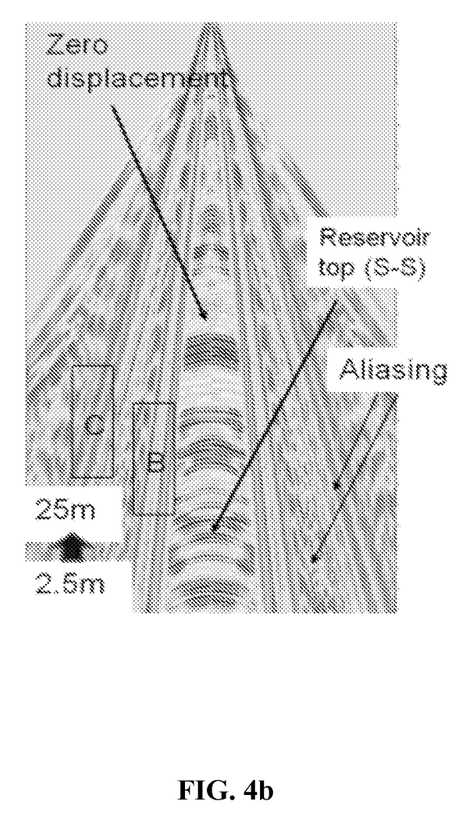
FIG. 4b shows the simulation results for an inline geophone shot gather after the data has been down sampled to a recoding interval of 25 meter, in a method to acquire seismic data according to one embodiment herein.

FIG. 4b displays the simulation results for an inline geophone shot gather after the data has been down sampled to a recoding interval of 25 meter. We observe similar ground roll (Scholte waves) as seen in FIG. 4a, and it is also aliased in this case as in FIG. 4a.

In general, the synthetic data (hydrophone and geophones) agree well with the field records including identifiable reflection events, surface waves and refracted waves. For example, a detailed comparison of these simulation results with field data demonstrates that we should expect extremely strong Scholte waves (Box B in FIG. 4b) and other P-related interface waves (Box C in FIG. 4b). This is confirmed by field observations (Box B in FIG. 4a for Scholte waves and Box C in FIG. 4a for interface waves). Because of the very shallow water depth and high velocity sea bottom layers consisting of reefs and anhydrites, trapped waves as well as interface waves keep rolling for a very long time. The waves shown in Box A in FIG. 4a contaminating the far-offset data are the leftover from a previous shot, which is not present in the simulation results in FIG. 4b. In addition these "ground roll" and interface waves are spatially under-sampled evident from the dispersion of these surface waves.

Figure 5:
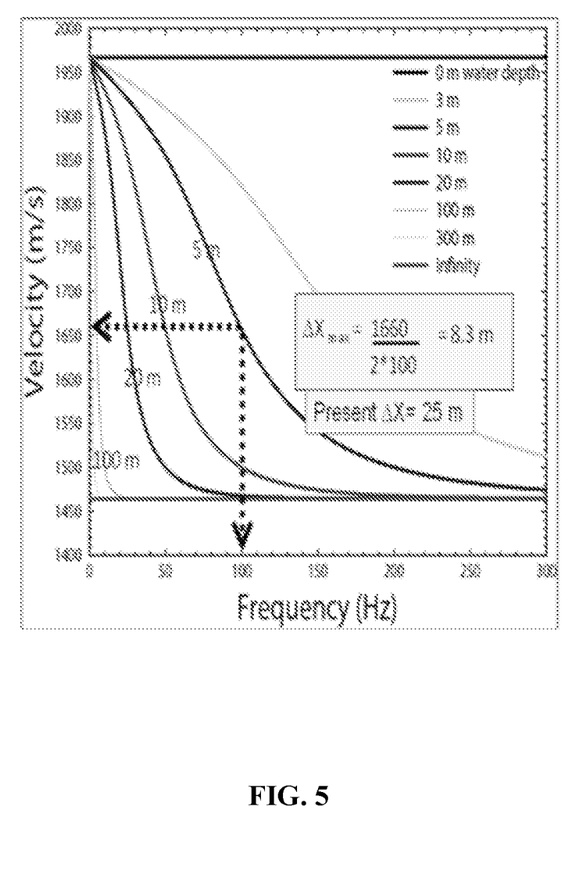
FIG. 5 illustrates a velocity over frequency graph for Scholte waves, based on a three-layer model consisting of two half-spaces with a water layer in between, according to one embodiment herein.

FIG. 5 is a frequency over wave number (cycles/km) graph illustrating a frequency-wave number spectra for a 2D 4C OBC data recording gathered in the Arabian Gulf, according to one embodiment herein. FIG. 5 illustrates Scholte wave velocity as a function of frequency for a geological model consisting of two half-spaces and a layer between them. The upper half space is air and the lower half space is solid with density 2.5 and P-velocity 4500 m/second. The depth of the water layer is varied from zero to infinity as indicated. The layer between is water and in the FIG. 5, the velocity is given for water layer thickness ranging from zero to infinity. For a water depth of 5 meter, for example, it is illustrated in the figure that if one has a high cut at 100 Hz one can accept a max sampling interval of 8.3 meter. Thus clearly the 25-meter spatial sampling interval as is not adequate.

If these Scholte wave and interface wave were weak (low amplitude) this might not represent a problem anyhow. This is also generally the case for areas like the North Sea, but as seen from FIG. 4a (left side) and confirmed in FIG. 4b the Scholte waves and interface waves are strong in shallow water environment and thus represent a serious of problem in the Arabic Gulf.

A high-resolution full-waveform elastic modeling based on well log data is further used to verify and separate the converted shear wave energy contained in the 4C OBC seismic data. We first set the shear-wave velocity to zero for the all layers to build an acoustic model and perform 2D and 3C FDM to obtain both pressure and inline geophone records. These synthetic records contain pure acoustic energy without any P-S and S-P conversions. We then keep the shear-wave velocity as it is for all the layers to build an elastic model and perform 2D and 3C FDM to obtain both pressure and inline geophone records. From these results we observe that the acoustic energy is dominant on hydrophone and vertical geophone. The pure acoustic energy on horizontal component is negligible which is at the same energy level as numerical noise. The difference of the pressure records between the elastic and acoustic modeling is the shear-wave energy contained in the pressure record. We find that the pure acoustic energy and P-S-P conversion are expected to be equally strong in field hydrophone record. On other hand, we find that inline geophone record is rather dominated by shear wave energy to such an extent that the inline geophone record might be treated as a reflected shear-wave record in shallow water environment.

The source used in the full-waveform finite-difference modeling (FDM) is a band-filtering wavelet with frequency ranging from 5 to 90 Hz. Difference studies of acoustic and elastic modeling results are used to discern converted wave modes. Normal move out and stacking are simulated on synthetic pressure and horizontal displacement seismograms to investigate the sampling effect on stacked OBC data.

Figure 6:
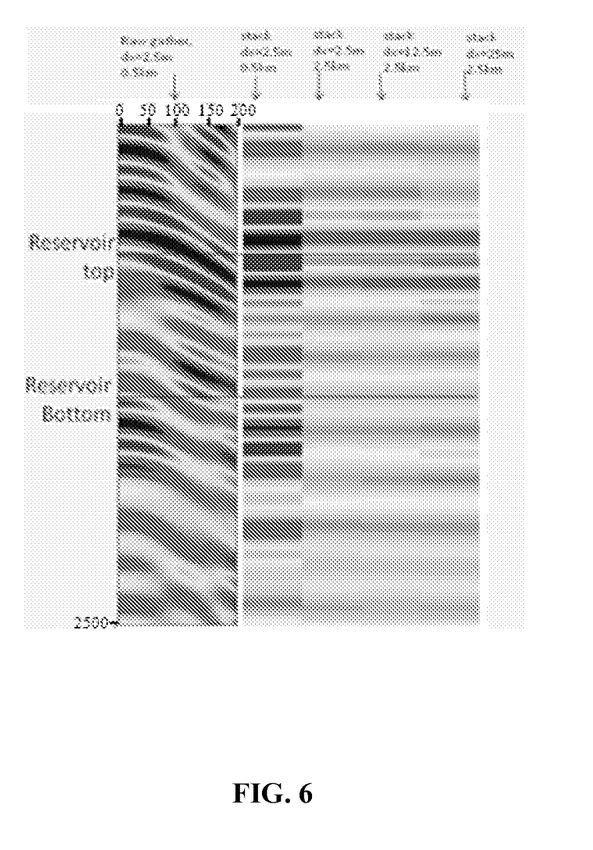
FIG. 6 illustrates an elastic modeling of a horizontal component of a 2D 4C OBC data recording gathered in the Arabian Gulf, according to one embodiment herein.

FIG. 6 illustrates a velocity over frequency graph for Scholte waves, based on a three-layer model consisting of two half-spaces with a water layer in between, according to one embodiment herein. A spatial aliasing affects on the 4C OBC data quality and shear-wave extraction is identified. FIG. 6 (left panel) shows part of a modeled gather for the inline horizontal component. The Reservoir top and bottom is marked as found from logs and using S-wave velocity. Then a stack based on the RMS velocity derived from the S-wave velocity log, assuming an instrument distance of 2.5 meter and using 0.5 km max offset. This will not reduce multiples to any extent. Also shown are the stack response for max offset 2.5 km and using 2.5, 12.5 and 25-meter instrument spacing respectively. One immediate observation is the strong AVO effect. We notice the marked differences between the different stacks. In order to extract reasonable S-wave information a dense spatial sampling and intelligent model-based offset-dependent stacking algorithms is applied. The same process has been done for P-wave and we also find significant effects on the stacks caused by different spatial samplings.

The advantage of the design for a sea bottom seismic in shallow water offers a full-waveform finite-difference modeling (FDM) used to band-filtering wavelet with frequency ranging from 5 to 90 Hz. Normal move out and stacking are simulated on synthetic pressure and horizontal displacement seismograms to investigate the sampling effect on stacked OBC data. The present method offers Stacking the horizontal component data using varying spatial sampling intervals (2.5, 12.5 and 25 m), which reveal significant differences on the respective final sections. The present method provides a spatial sampling interval that respects the Scholte waves and similar ground roll type waves. This will consequently make it possible to remove Scholte waves and similar ground roll type waves and thus generate a much better image of the underground.

The present method avoids spatial aliasing and ensures numerical stability by using 2D finite difference grid Size of 2.5 m×2.5 m and a temporal sampling interval of 0.25 ms in the forward FDM elastic modeling.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A method to acquire seismic data to estimate reservoir characteristics in a shallow sea water environment, the method comprises:
    placing a seismic source in a body of ocean water;
    using the seismic source to generate a plurality of pressure wave shots in the water while varying a time delay and spacing between the plurality of shots;
    using a hydrophone and a three component geophone to detect the plurality of shots and thereby acquire four component ocean bottom cable (4C OBC) seismic data;
    applying a full acoustic modelling process and an elastic modelling process to the acquired 4C OBC seismic data to analyze the acquired 4C OBC seismic data to acquire a pressure data and an inline geophone data;
    estimating a horizontal component data and a reflected shear wave data from the acquired 4C OBC seismic data;
    performing a NMO-correction process on the estimated horizontal component data; and
    stacking the acquired horizontal component data obtained by varying sampling intervals to remove noise component in acquired seismic data; wherein the full acoustic modelling process is applied by setting a shear wave velocity to zero for all layers to perform 2D and 3D full waveform finite-difference modelling (FDM) to acquire both the pressure data and the inline geophone data, and further wherein the elastic modelling process is applied by using a 2D finite-difference grid with a size of 2.5 m ×2.5 m and a temporal sampling interval of 0.25 ms to avoid spatial aliasing and to ensure numerical stability.

2. The method according to claim 1, wherein the 4C OBC seismic data is acquired using a numeric full wave form elastic model.

3. The method according to claim 1 further comprises building earth models including 1000 layers by using density, compression and shear wave logs acquired near 2D 4C OBC seismic limes.

4. The method according to claim 1, wherein the full acoustic modelling is applied using a hydrophone source and wherein the hydrophone source is a band filtering wavelet with a frequency of 5-90 hertz.

5. The method according to claim 1, wherein the elastic modelling is applied based on the density, compression and shear wave logs to verify and separate a shear wave energy included in the acquired 4C OBC seismic data.

6. The method according to claim 1, further comprising acquiring a shear wave energy based on a difference between a pressure data acquired by using an acoustic modelling and a pressure data acquired by using an elastic modelling.

7. The method according to claim 1, wherein the inline horizontal component is acquired by marking a reservoir top level and a reservoir bottom level based on acquired S-wave velocity log data, and by creating a stack based on a RMS velocity derived from the S-wave velocity log and by assuming an instrument distance of 2.5 meter and a maximum off set of 0.5 km.

8. The method according to claim 1, wherein a time delay between the shots fired in a shallow water environment is more than a time delay between the shots fired in a deep water environment.

9. The method according to claim 1, wherein spacing between the shots fired in a shallow water environment is more than spacing between the shots fired in a deep-water environment.

10. The method according to claim 1 further comprises applying multiple attenuation algorithms to reduce a noise due to Sholte waves in a present shot and a noise due to Sholte waves in a previous shot.

11. The method according to claim 1, wherein 4C OBC seismic data is processed using a forward elastic modelling to use PS-S reflections to estimate a shear wave properties of a sea bed and a subsurface carbonate reservoir.

* * * * *